(12) United States Patent
Nushii et al.

(10) Patent No.: US 6,371,231 B1
(45) Date of Patent: Apr. 16, 2002

(54) AUTOMOTIVE VEHICLE BONNET STRUCTURE

(75) Inventors: Hiro Nushii; Syuuichiro Iwatsuki, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/639,097

(22) Filed: Aug. 16, 2000

(30) Foreign Application Priority Data

Aug. 18, 1999 (JP) .......................................... 11-231774

(51) Int. Cl.$^7$ .............................................. B62D 25/12
(52) U.S. Cl. ................................... 180/69.21; 180/69.2
(58) Field of Search ............................. 180/69.21, 69.2

(56) References Cited

U.S. PATENT DOCUMENTS

| | | | | |
|---|---|---|---|---|
| 3,225,857 A | * | 12/1965 | De Haan et al. | 180/69.21 |
| 4,012,807 A | * | 3/1977 | Kern | 180/69.2 |
| 4,366,598 A | * | 1/1983 | Harasaki et al. | 180/69.21 |
| 5,411,109 A | * | 5/1995 | Orns | 180/69.2 |
| 5,806,619 A | * | 9/1998 | Kleinhoffer et al. | 180/69.2 |

FOREIGN PATENT DOCUMENTS

| | | | | |
|---|---|---|---|---|
| DE | 1103163 B | | 12/1959 | |
| DE | 3046056 C2 | | 1/1982 | |
| EP | 0486093 B1 | | 5/1992 | |
| FR | 46005 | * | 5/1960 | 180/69.21 |
| JP | 59-034979 A | | 2/1984 | |
| JP | 49103 | * | 3/1991 | 180/69.21 |
| JP | 6-278657 A | | 3/1993 | |
| JP | 11-91627 | | 4/1999 | |

* cited by examiner

Primary Examiner—Douglas Hess
Assistant Examiner—Elaine Gort
(74) Attorney, Agent, or Firm—Armstrong, Westerman & Hattori, LLP

(57) ABSTRACT

In an automotive vehicle bonnet, that the bonnet 20 is held open by allowing a hook portion 52 at a distal end of an opening stay 50 extending from a body 14 side to be hooked up to the vicinity of a hinge 30R of the bonnet 20. A reinforcement member 60 is incorporated in the bonnet 20 for reinforcing a hook retaining portion 34 to which the distal end of the opening stay 50 is hooked up. The reinforcement member 60 is constituted by an extruded member having a closed cross section.

4 Claims, 11 Drawing Sheets

AUTOMOTIVE VEHICLE BONNET STRUCTURE

BACKGROUND OF THE INVENTION

1. Field of the Invention

The present invention relates to a structure for an automotive vehicle bonnet for closing an engine compartment of the vehicle.

2. Description of the Related Art

FIGS. 12A, 12B are side views of conventional automotive vehicle bonnets.

In a common automotive vehicle 100 shown in FIG. 12A, a bonnet 103 attached via hinges 102 to a body 101 side of the vehicle in such a manner as to be opened and/or closed is held open by hooking up a distal end of an opening stay 104 extending from the body 101 side to the vicinity of a distal end of the bonnet 103 (hereinafter, referred to as a "prior art No. 1") By the way, the reduction in weight of the opening stay is also important to reduce the weight of the automotive vehicle 100.

FIG. 12B shows that a bonnet 103 is held open by hooking up a distal end of an opening stay 104 extending from a body side of the vehicle to a hook retaining portion 105 provided in the vicinity of a hinge 102 (herein after referred to as a "Prior art No. 2"). Since the opening stay 104 is hooked up to the vicinity of the hinge 102, the length of the opening stay 104 can be reduced.

In FIG. 12B, it is usual to press the distal end of the bonnet 103 downwardly to close the bonnet 103 that is being held open. However, it may happen that the distal end of the bonnet 103 is pressed downwardly with the opening stay 104 being hooked up to the bonnet 103. Since a distance from the hinge 102 which functions as a closing fulcrum to the hook retaining portion 105 is short, a large downward load is applied to the hook retaining portion 105 and its mounting portion. Due to this, sufficient rigidity needs to be secured at the hook retaining portion 105 and the vicinity of its mounting portion.

An automotive vehicle bonnet whose rigidity is improved is known in, for example, JP-A-11-91627 entitled "an automotive vehicle hood structure" (hereinafter, referred to as a "prior art No. 3").

Disclosed in this prior art No. 3, as shown in FIG. 13A, a bonnet 203 in which a bonnet inner panel 202 is overlaid on and joined to a bonnet outer panel 201.

Furthermore, in the above prior art No. 3, as shown in FIGS. 13A and 13B, a plate-like reinforcement 216 is disposed on a front central portion of the bonnet inner panel 202 at a position where a striker 209 and rubber bumpers 210, 210 are provided, and this reinforcement 216 is joined to the bonnet inner panel 202 with a predetermined space being provided therebetween, whereby a closed section 217 is formed between the two members 202, 216.

As a result of this, according to the prior art No. 3, when the bonnet 203 is pressed downwardly in an attempt to close the same, the bonnet outer panel 201 and the bonnet inner panel 202 can be prevented from being deformed at the position where the striker 209 and the rubber bumpers 210, 210 are provided.

However, it is not possible to apply the contents of the prior art No. 3 directly to the prior art No. 2. The prior art No. 3 is such that it improves the overall rigidity of the portion of the bonnet inner panel 202 where the closed section 217 is provided but does not improve the surface rigidity of the portion where the striker 209 and the rubber bumpers 210, a 210 are provided.

On the other hand, in the prior art No. 2 shown in FIG. 12B, since the hook retaining portion 15 is provided in the vicinity of the hinge 102 on the bonnet 103, an extremely large concentrated load is applied to the hook retaining portion 105 and its mounting portion. A further device needs to be contrived to secure sufficient rigidity at the hook retaining portion 105 and the vicinity of its mounting portion in order to deal with such an excessively large load. It is not a good idea to reinforce the hook retaining portion 105 and the vicinity of its mounting portion with a simple plate member as done in the above prior art No. 3 because the thickness of the plate member increases, whereby the weight thereof increases.

SUMMARY OF THE INVENTION

To cope with the above problem, an object of the invention is to provide a technique for enabling not only the improvement in rigidity of a portion to which a distal end of an opening stay is hooked up with a reinforcement member while attempting to reduce the weight of the opening stay but also the reduction in weight of the reinforcement member.

With a view to attaining the above object, according to an aspect of the invention, there is provided an automotive vehicle bonnet structure, comprising: an opening stay extending from a vehicle body side; a hook retaining portion disposed on the vicinity of a hinge between a bonnet and a vehicle body, for hooking up a distal end of the opening stay to hold the bonnet in an ope state; and a reinforcement member incorporated in the bonnet, for reinforcing the hook retaining portion, wherein the reinforcement member is constituted by an extruded member having a closed section, i.e. a hollow extended member.

Since the distal end of the opening stay for holding the bonnet open is hooked up to the hook retaining portion provided in the vicinity of the hinge, the opening stay can be made short, and as a result of this, the opening stay can be made lighter in weight.

Since the reinforcement member is the extruded member having the closed section, although it is thin, the reinforcement member has high bending and torsional rigidities, and moreover, the member is light in weight. Thus, the hook retaining portion can be sufficiently reinforced with the highly rigid reinforcement member.

DETAILED DESCRIPTION OF THE PREFERRED EMBODIMENTS

Figure 1:
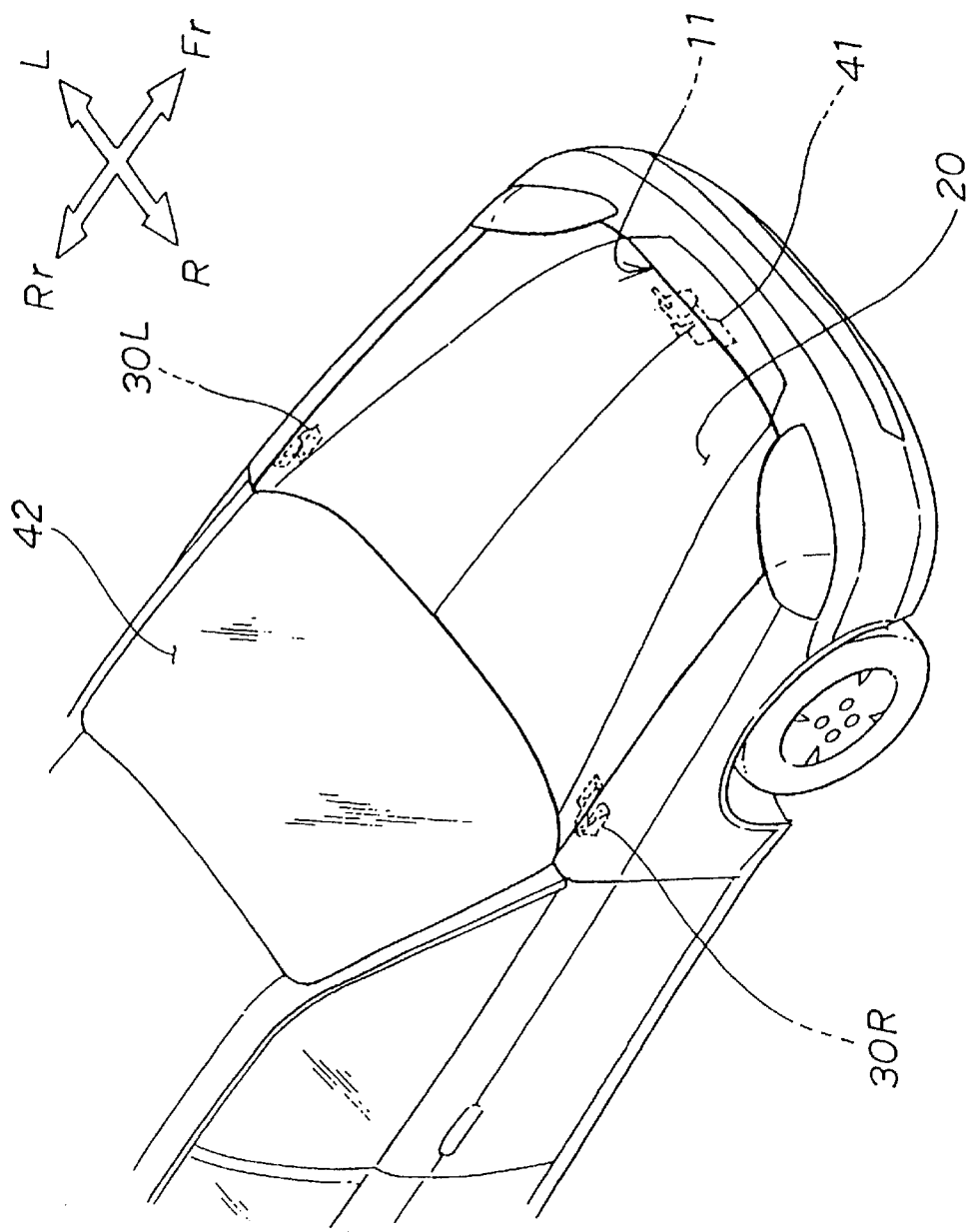
FIG. 1 is a perspective view showing a front-half portion of an automotive vehicle according to the invention.

Embodiments of the invention will be described with reference to the accompanying drawings. Note that "front," "rear," "left," "right," "upper," and "lower" denote respective directions as viewed from the driver, and Fr denotes a front side; Rr, a rear side; L, a left-hand side; R, a right-hand side; and CL, a lateral center (a center) of the vehicle. In addition, note that the drawings are to be seen in directions in which reference numerals are oriented.

FIG. 1 is a perspective view of a front-half portion of an automotive vehicle according to the invention.

In the automotive vehicle 10, a bonnet 20 is provided to close an engine compartment provided at a front portion of the vehicle body, and this bonnet 20 is attached to a body frame (not shown) via left and right hinges 30L, 30R at a rear end portion thereof. The bonnet 20 is a member adapted to be opened frontward and can be locked to the vehicle body at a front portion thereof with a locking mechanism 41. In the drawing, reference numeral 42 denotes a windshield.

Figure 2:
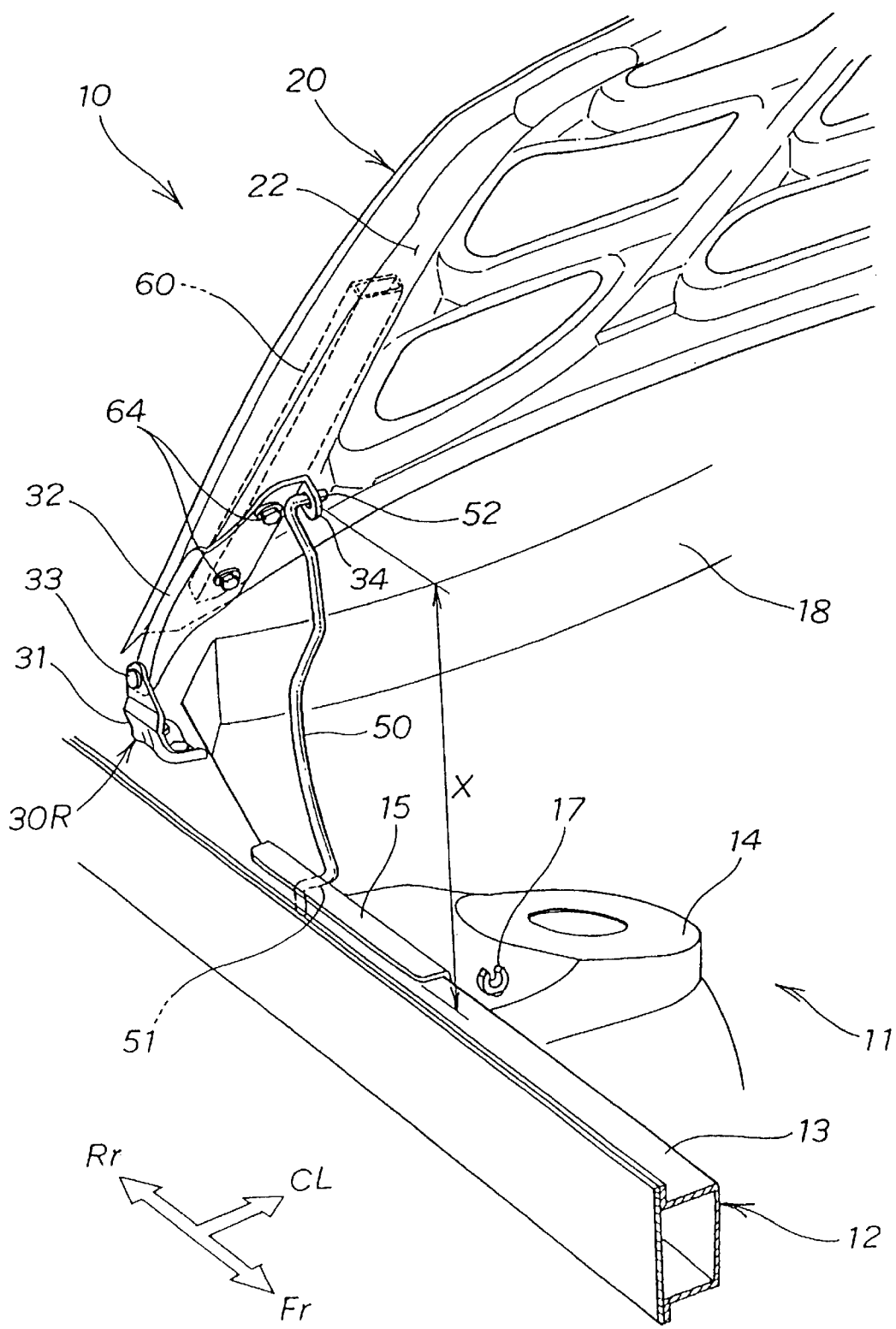
FIG. 2 is a perspective view showing the vicinity of a right-hand side hinge of a bonnet according to the invention.

FIG. 2 is a perspective view showing a view around the right-hand side hinge of the bonnet according to the invention, and the bonnet 20 is shown as being held open.

The right-hand side hinge 30R includes a support body 31 attached to a side member 13 of a body frame 12, a bonnet attachment arm 32 attached to the bonnet 20 and a hinge pin 33 for attaching the bonnet attachment arm 32 to an upper end of the support body 31 in such a manner as to rotate in vertical directions. The structure of a left-hand side hinge 30L shown in FIG. 1 is identical to that of the right-hand side hinge 30R.

The right-hand side hinge 30R comprises a hook retaining portion 34 provided at a distal end of the bonnet attachment arm 32. On the other hand, a base portion 51 of an opening stay 50 is attached to a flange 15 provided at an upper end of a front damper housing 14 provided at the side member 13 in such a manner as to swing in longitudinal directions (forward and rearward directions). The opening stay 50 is a rod-like stay having a hook portion 52 formed by bending a distal portion of the stay, so that the hook portion 52 can be detachably hooked up to the hook retaining portion 34.

When the bonnet 20 is opened, the hook portion 52 at the distal end of the opening stay 50 extending from the front damper housing 14 on the body side is hooked up to the hook retaining portion 34 in the vicinity of the hinge 30R on the bonnet 20, whereby the bonnet 20 can be held open. The full opening stroke X of the bonnet 20 in the vicinity of the hinge 30R is shorter than the full opening stroke of the bonnet 20 at a distal end thereof. Since the distal end of the opening stay 50 is hooked up to the vicinity of the right-hand side hinge 30R where the full opening stroke X is short, the opening stay 50 can be made short. As a result of this, the opening stay 50 can be made light in weight.

The front damper housing 14 has a stay-retaining clip 17 attached to an upper portion thereof. When the opening stay 50 detached from the hook retaining portion 34 is allowed to fall down forward, the opening stay 50 is received and held in the stay-retaining clip 17. In FIG. 2, reference numeral 18 denotes a cross member.

Figure 3:
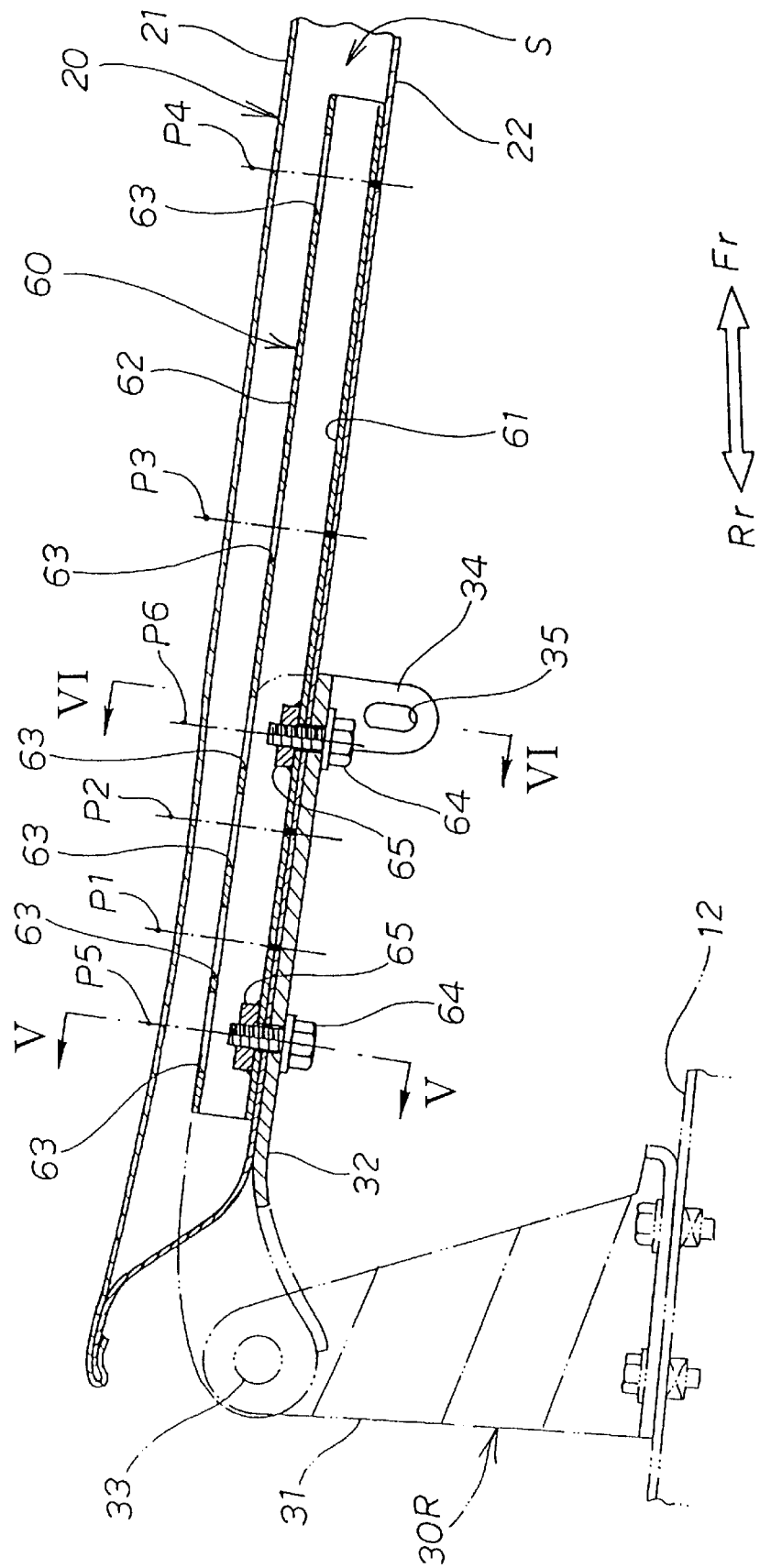
FIG. 3 is a side cross sectional view showing a mounting portion of the right-hand side hinge of the bonnet according to the invention.

FIG. 3 is a side cross-sectional view of a portion where the right-hand side hinge is attached to the bonnet according to the invention.

The bonnet 20 is constructed such that an inner frame 22 functioning as a reinforcement member is overlaid underneath an outer panel 21 so as to be integrated therewith with a predetermined space S being provided between the two members. The outer panel 21 and inner panel 22 are formed of an aluminum or aluminum-ally plate material.

Furthermore, in the bonnet 20, a reinforcement member 60 is inserted in the space S between the outer panel 21 and inner panel 22 and a lower plate 61 of the reinforcement member 60 is overlaid on an upper surface of the inner frame 22 so as to be joined thereto at a position where the bonnet attachment arm 32 is provided. For example, the member 60 is joined by spot welding or plug welding at four locations arranged in a longitudinal direction such as positions P1, P2, P3, P4. The reinforcement member 60 is disposed such that a substantially longitudinal center thereof is located at the position of the hook retaining portion 34.

FIG. 3 shows that the lower surface of the bonnet 20 is bolted to the bonnet attachment arm 32 of the right-hand side hinge 30R at two locations such as positions P5, P6.

Holes 63 . . . ( . . . denotes plurality, and the same applies below) are formed in an upper plate 62 of the reinforcement member 60 at the positions P1 to P6 for the purpose of the operation and reduction in weight of the reinforcement member 60. The joining work of the reinforcement member 60 and mounting work of nuts 65, 65, which will be described later, are carried out through these holes 63 . . .

The hook retaining portion 34, bonnet attachment arm 32 and their mounting portions are sufficiently reinforced with the highly rigid reinforcement member 60, thereby making it possible to secure sufficient rigidity. Consequently, a large downward load can be carried by the hook retaining portion 34.

Furthermore, since the reinforcement member 60 is incorporated in the bonnet 20, there is no risk of the reinforcement member 60 being exposed from the bonnet 20, thereby making it possible to improve the appearance thereof.

Figure 4:
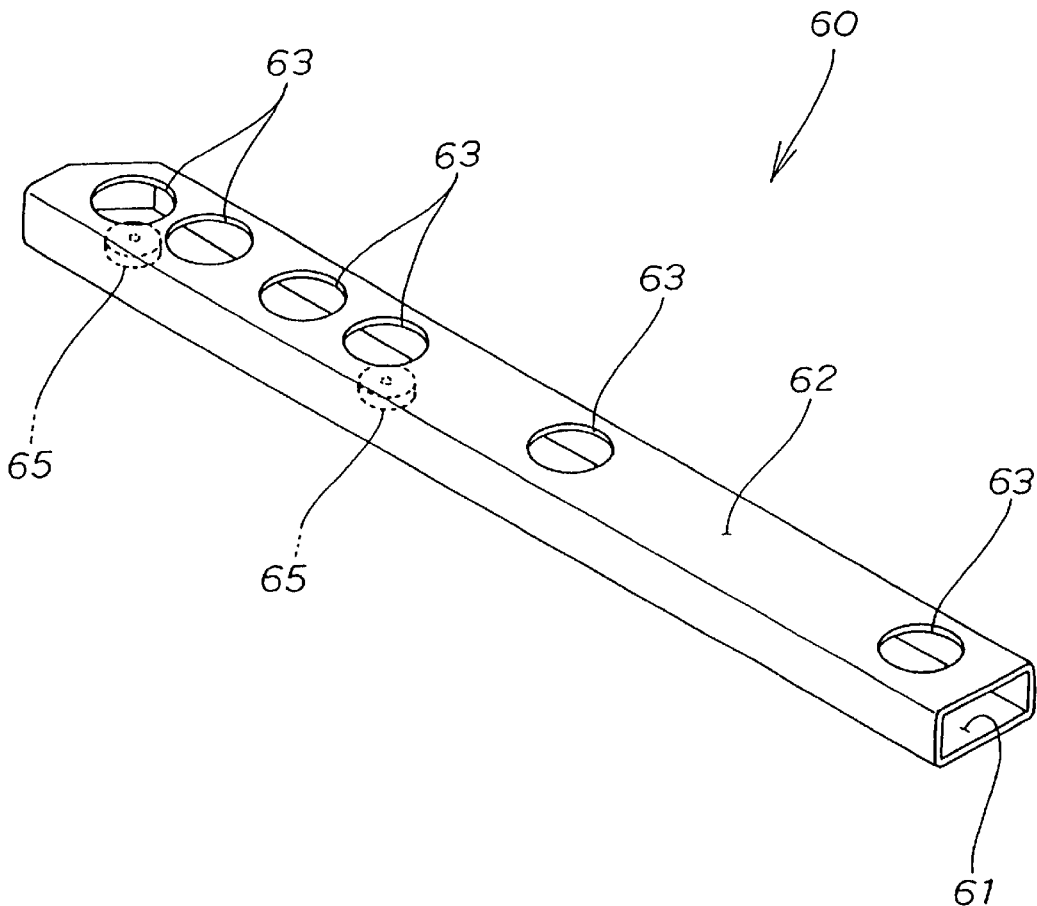
FIG. 4 is a perspective view showing a reinforcement member according to the invention.

FIG. 4 is a perspective view of the reinforcement member according to the invention and shows that the reinforcement member 60 is an extruded member having a rectangular closed cross section, i.e. a hollow extruded member. To be specific, the reinforcement member 60 is an angular pipe and this angular pipe is an extruded profile of aluminum or aluminum-alloy (JIS H 4100), i.e. an extruded product of an aluminum material.

The reinforcement member 60 has high bending and torsional rigidities because it is a member having a closed cross section. Since the reinforcement member 60 still may be thin to reinforce the bonnet 20 (refer to FIG. 3), it is possible to reduce the weight thereof. Moreover, since the reinforcement member 60 of aluminum is used, the weight of the reinforcement member 60 can be reduced further, and furthermore, since the reinforcement member 60 is the extruded material, much cost is not required for processing.

Figure 5:
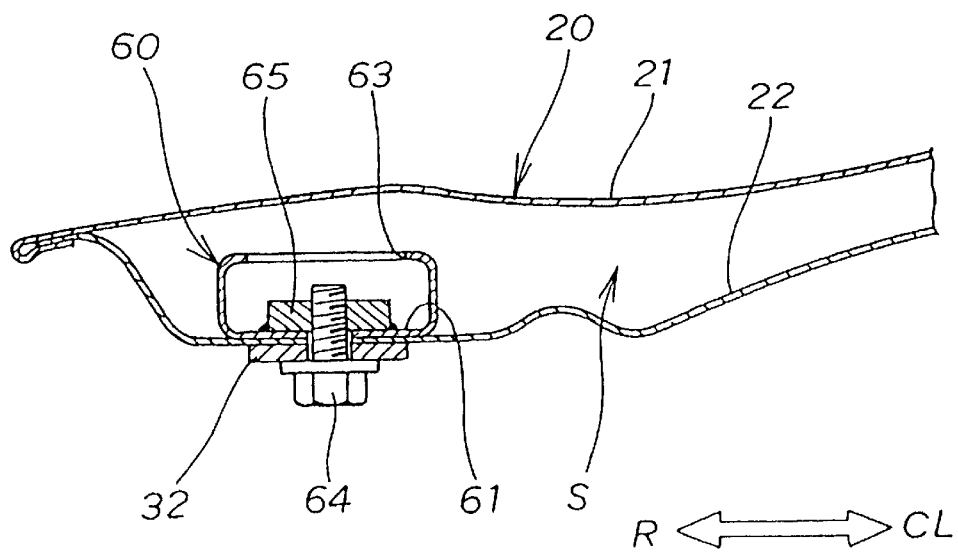
FIG. 5 is a cross sectional view taken along the line V—V of FIG. 3.

FIG. 5 is a cross section taken along the line V—V of FIG. 3 and shows that the lower plate 61 of the reinforcement member 60 incorporated in the bonnet 20, the inner frame 22 and the bonnet attachment arm 32 are fastened together with a bolt 64 and a nut 65. The nuts 65 are welded or crimped to the reinforcement member 60.

Figure 6:
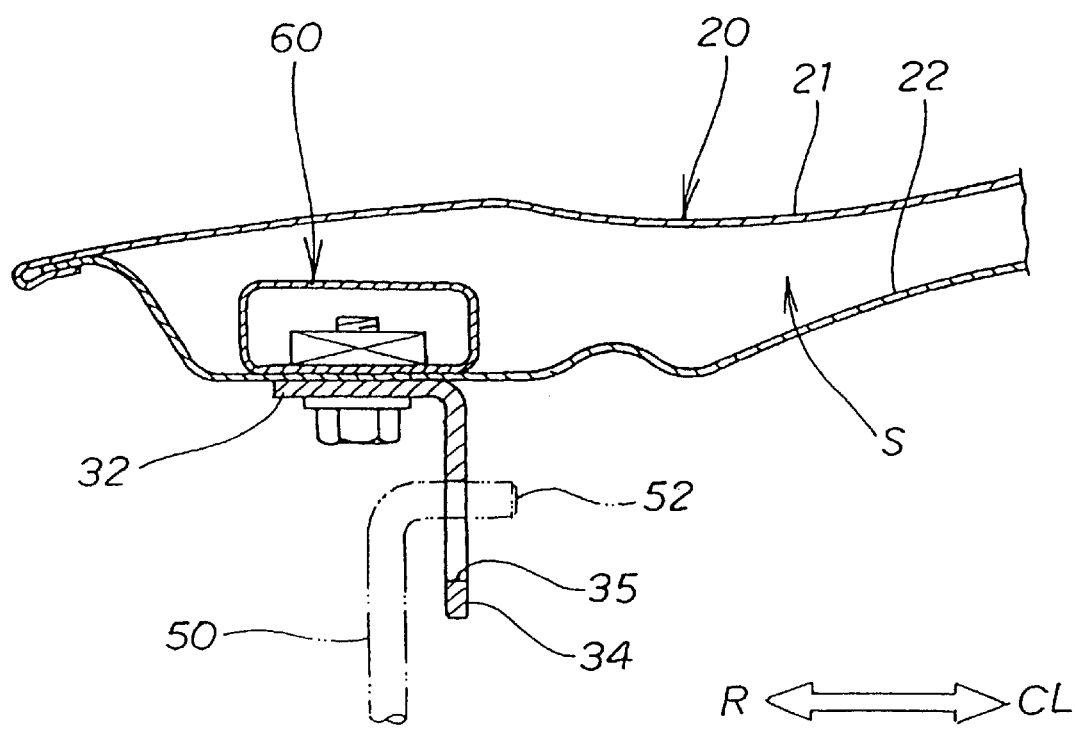
FIG. 6 is a cross sectional view taken along the line VI—VI of FIG. 3.

FIG. 6 is a cross section taken along the line VI—VI of FIG. 3 and shows that the plate-like hook retaining portion 34 is extended downward from the bonnet attachment arm 32, a hook retaining hole 35 is formed in the hook retaining portion 34, and the hook portion 52 of the opening stay 50 is hooked up to the hook retaining hole 35.

Furthermore, FIG. 6 shows that the hook retaining portion 34 and the vicinity of its mounting portion are reinforced with the reinforcement member 60 by disposing the same reinforcement member 60 directly above where the hook retaining portion 34 is provided.

Figure 7:
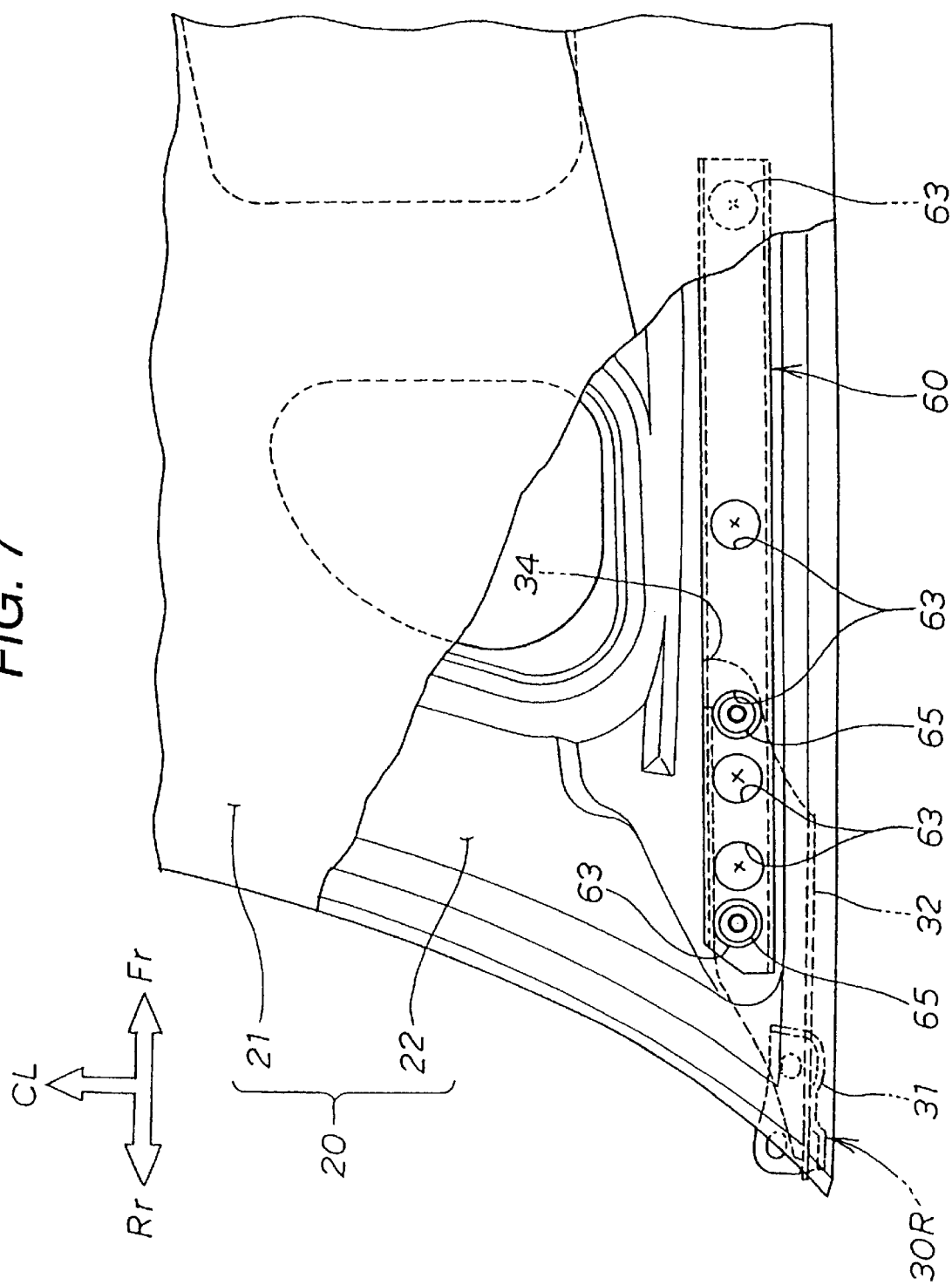
FIG. 7 is a plan view showing the vicinity of the right-hand side hinge of the bonnet according to the invention.

FIG. 7 is a plan view showing a portion of the bonnet 20 according to the invention where the right-hand side hinge is attached and shows a state in which the outer panel 21 is partially cut away.

Furthermore, this figure shows a state in which the reinforcement member 60 is disposed directly above and along the bonnet attachment arm 32.

Figure 8:
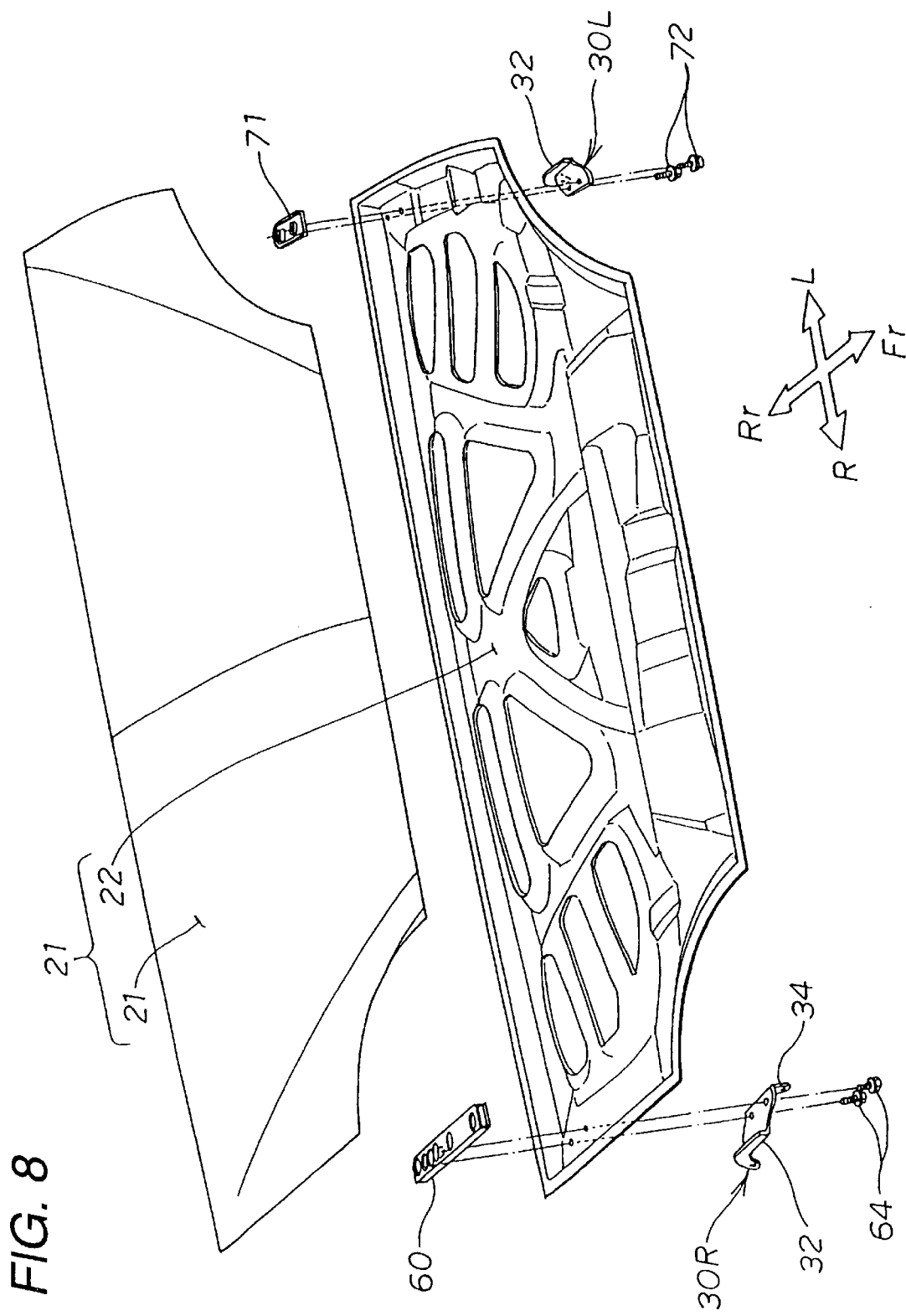
FIG. 8 is an exploded perspective view of the bonnet according to the invention.

FIG. 8 is an exploded perspective view of the bonnet according to the invention and shows a relationship among a right-hand side end portion of the inner frame 22, the reinforcement member 60 overlaid on the end portion and the bonnet attachment arm 32 of the right-hand side hinge 30R.

Furthermore, this figure shows that a reinforcement plate 71 is overlaid on a left-hand side end portion of the inner frame 22 and that a bonnet attachment arm 32 of a left-hand side hinge 30L are attached to the reinforcement plate 71 with bolts 72, 72.

Figure 9:
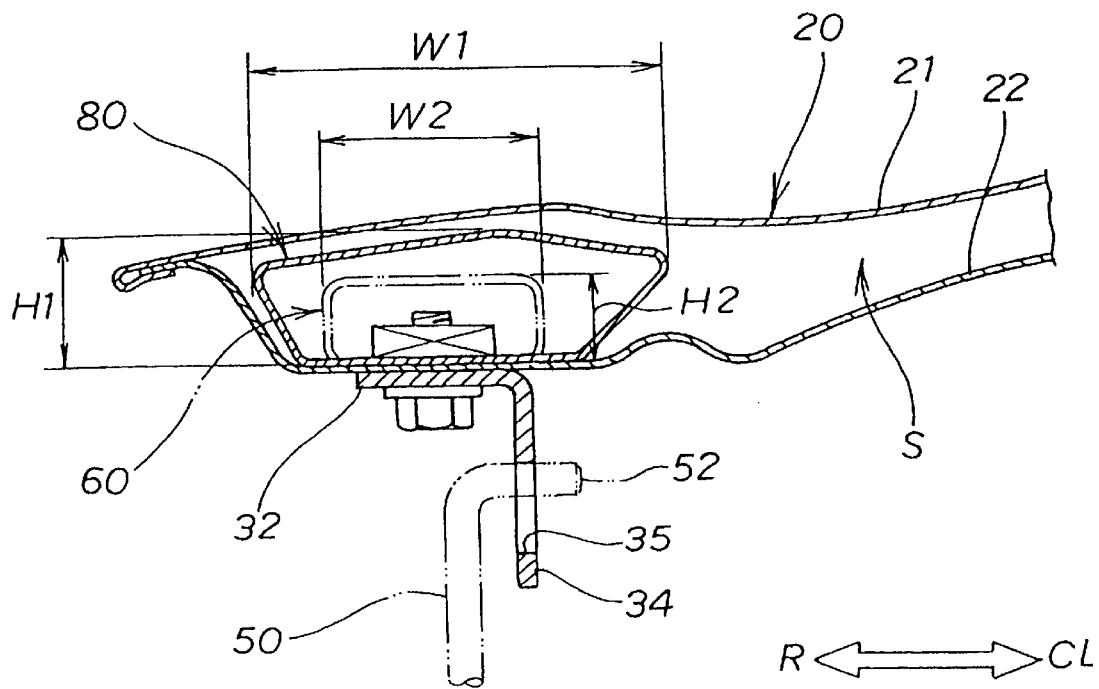
FIG. 9 is a view showing a first modification of the automotive vehicle bonnet structure according to the invention.

FIG. 9 shows a modification of the automotive vehicle bonnet structure according to the invention and is a cross sectional view corresponding to FIG. 6.

A reinforcement member 80 according to this modification is characterized in that the reinforcement member 80 is set as substantially conforming to the shape of the space S in the bonnet 20 and being formed larger than the aforesaid example. To be specific, the reinforcement member 80 is an extruded member having a pentagonal closed cross section and is larger than the reinforcement member 60 having the rectangular cross section which is indicated by imaginary lines in the same figure (refer to FIG. 6). For example, the width W1 and height H1 of the reinforcement member 80 according to the modification are larger than the width W2 and height H2 of the reinforcement member 60 having the rectangular cross section, respectively (W1>W2, H1>H2). As a result of this, since the modulus of section of the reinforcement member 80 according to the modifcation becomes larger, the rigidity thereof increases further, whereby further sufficient rigidity can be secured at the hook retaining portion 34, the bonnet attachment arm 32 and their mounting portions.

In addition, in a case where the modulus of section of the reinforcement member 80 according to the modification is set equal to that of the reinforcement member 60 indicated by the imaginary lines, since the thickness of the modified reinforcement member 80 can be reduced, the reinforcement member 80 can be made much lighter in weight.

Note that the structure of the remaining portions of the reinforcement member 80 according to the modified example is identical with that of those of the reinforcement member 60 indicated by the imaginary lines, and therefore the description thereof will be omitted with like reference numbers being given to like portions.

Figure 10:
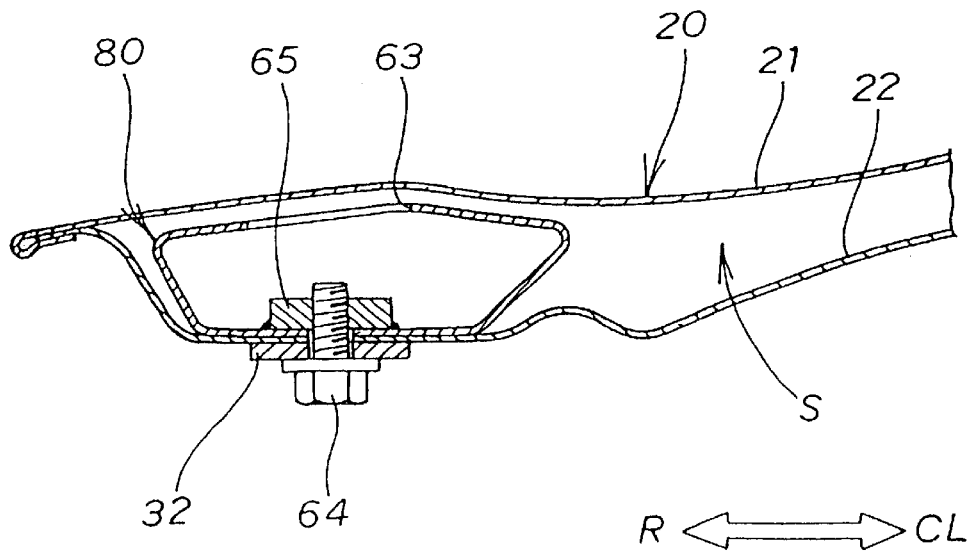
FIG. 10 is a view showing a second modification of the automotive vehicle bonnet structure according to the invention.

FIG. 10 shows the automotive vehicle bonnet structure according to the modification of the invention and is a cross sectional view corresponding to FIG. 5, which shows a reinforcement member 80 and a bonnet attachment arm 32 according to this modification.

Figure 11:
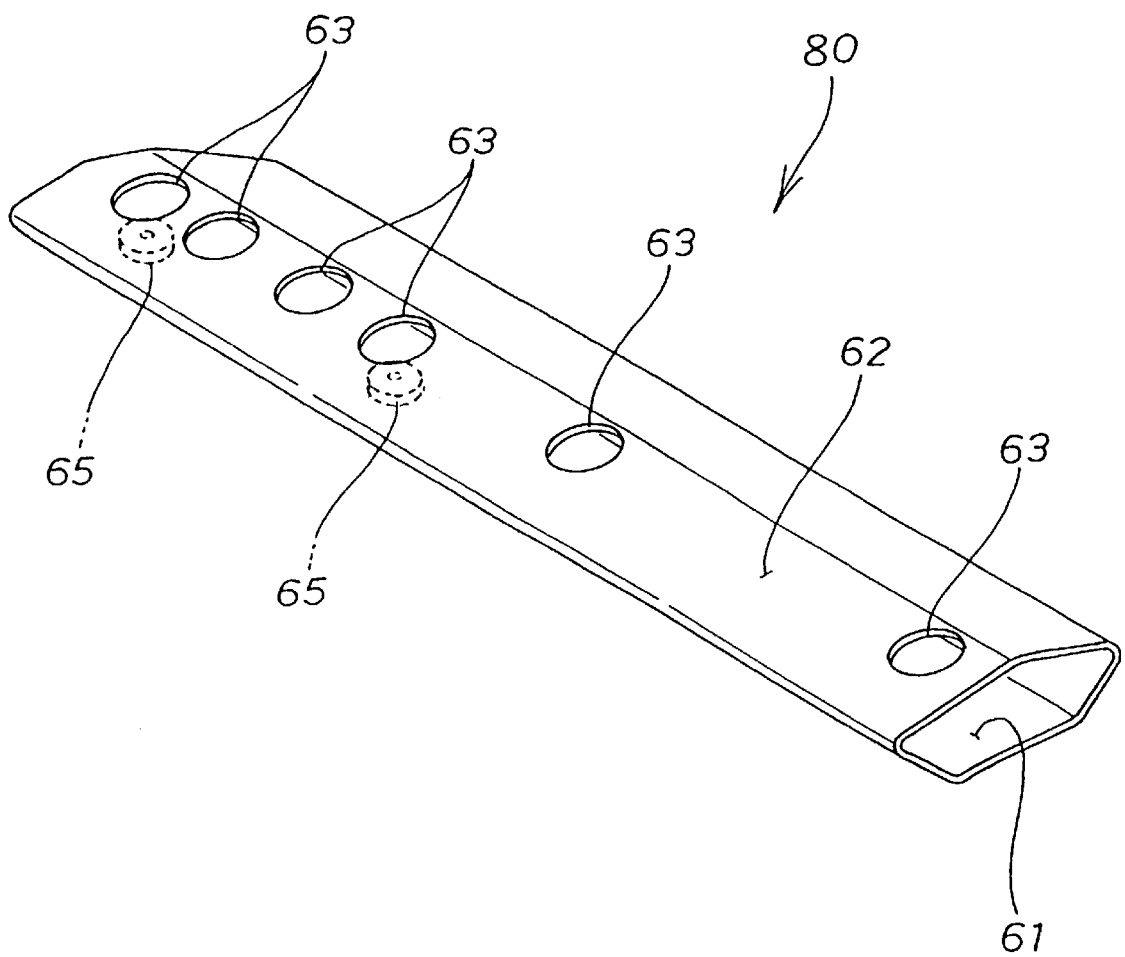
FIG. 11 is a perspective view showing a reinforcement member according to the modification of the invention.
Figure 12A:
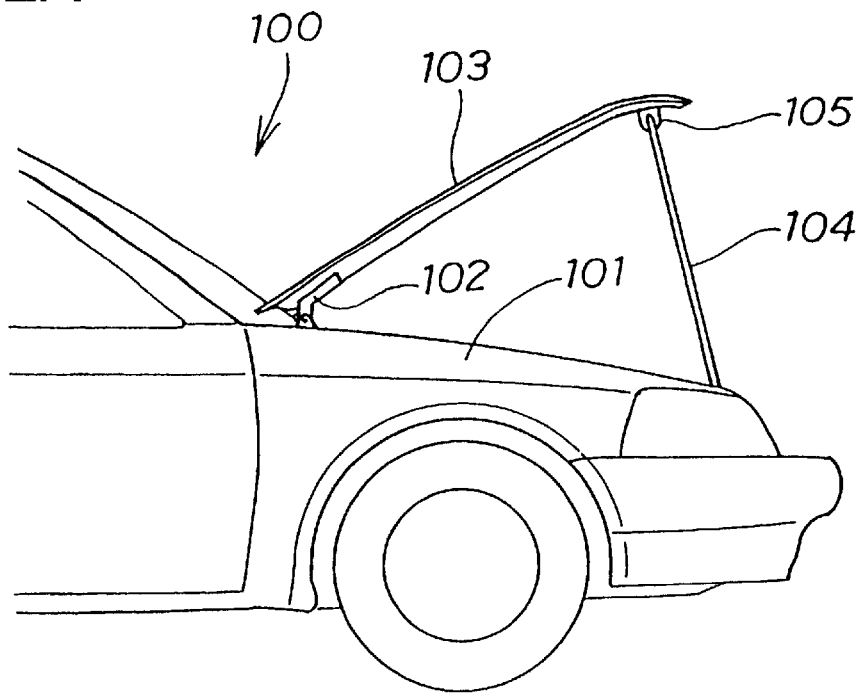
FIGS. 12A and 12B are side views showing conventional automotive vehicle bonnets.
Figure 12B:
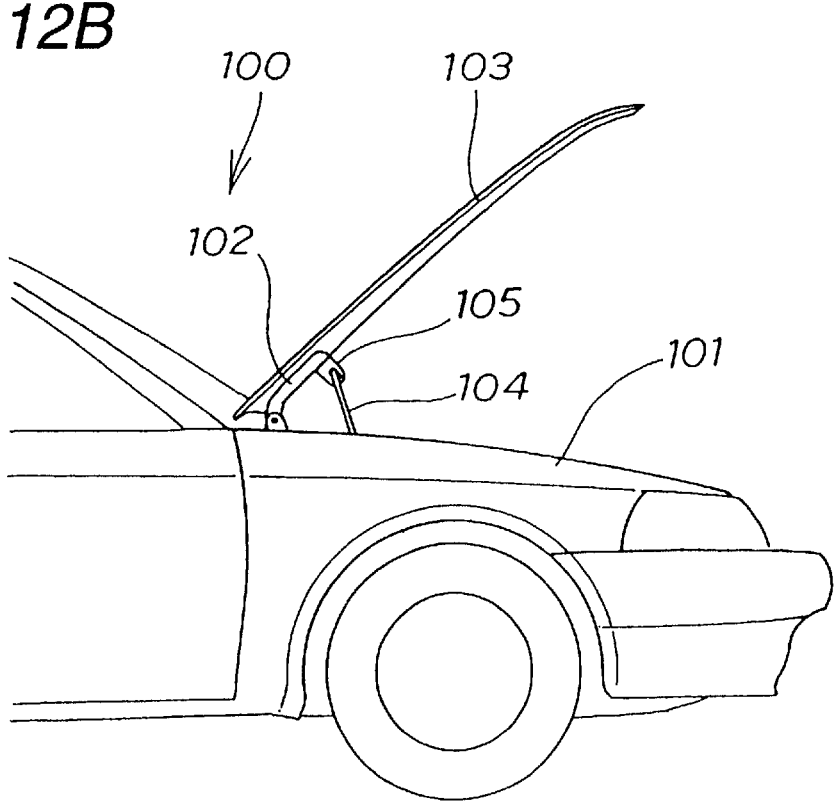
Figure 13A:
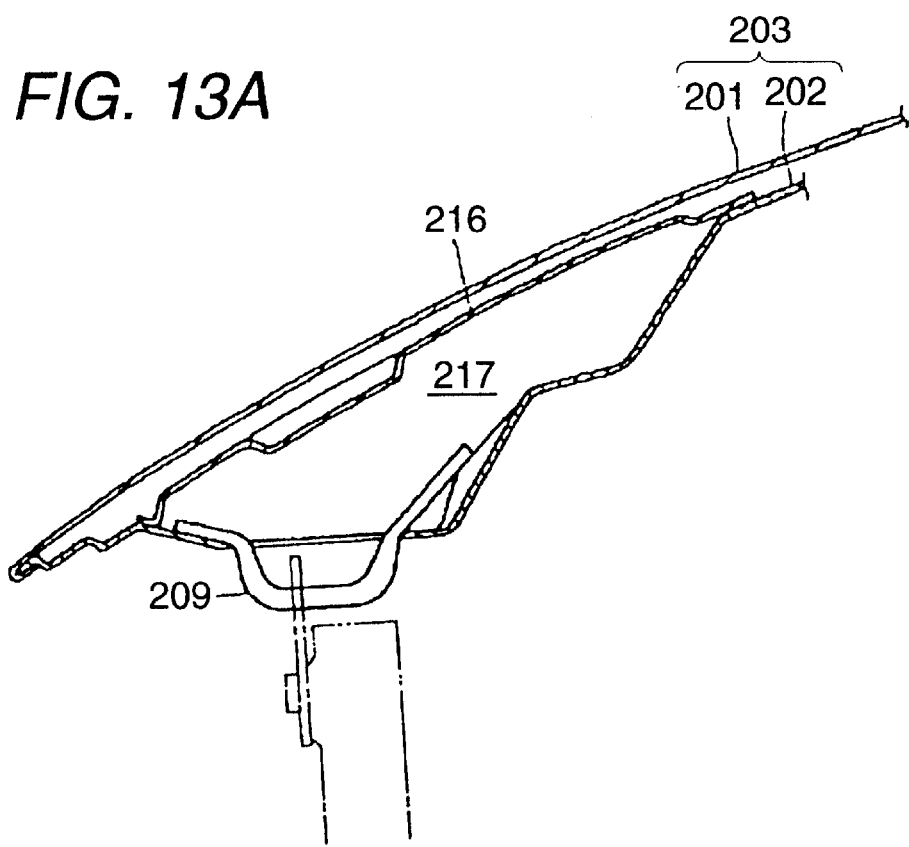
FIGS. 13A and 13B are cross sectional views showing another conventional automotive vehicle bonnets.
Figure 13B:
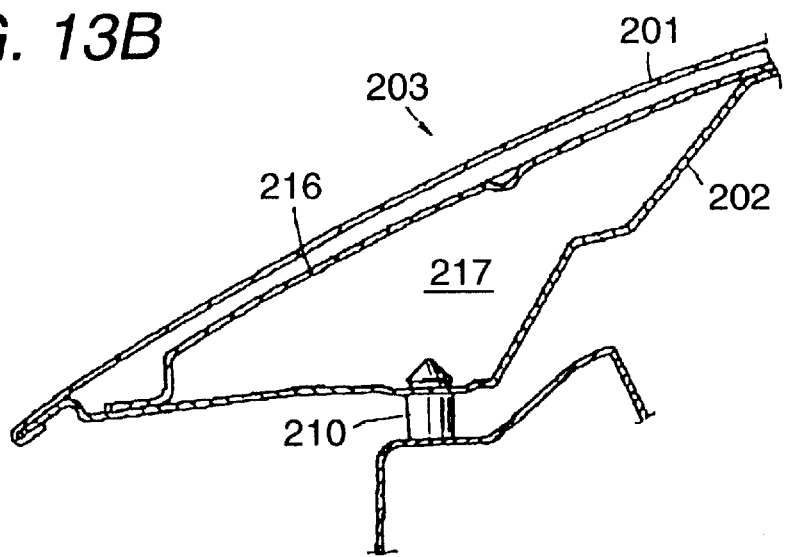

FIG. 11 is a perspective view showing the reinforcement member according to the modification of the invention and shows that the reinforcement member 80 according to the modification is an extruded member having a pentagonal closed cross section clearly. These modified reinforcement members 80 are also formed of the same material as that of the reinforcement member 60 shown in FIG. 4.

Note that the embodiments of the invention are not limited to the structure in which the hook retaining portion 34 is provided at the distal end of the bonnet attachment arm 32, and the hook retaining portion 34 may be provided in the vicinity of the right-hand side hinge 30R or the left-hand side hinge 30L of the bonnet 20.

In addition, note that the shape, dimensions, material and attachment structure of the reinforcement members 60, 80 may be determined optionally, provided that they are constituted by an extruded member having a closed cross section.

The invention provides the following effects when constructed as described above.

According to the aspect of the invention, since the distal end of the opening stay for holding the bonnet open is hooked up to the hook retaining portion provided in the vicinity of the hinge on the bonnet 20, the length of the opening stay can be reduced, and the reduction in weight of the opening stay results.

Furthermore, since the reinforcement member for reinforcing the hook retaining portion to which the distal end of the opening stay is hooked up is constituted by the extruded member having the closed cross section, while the thickness of the reinforcement member can be reduced, the reinforcement member can not only hold higher bending and torsional rigidities but also can be made lighter in weight. Since the hook retaining portion is provided while the highly rigid reinforcement member is incorporated in the bonnet, the hook retaining portion can sufficiently be reinforced.

Thus, the bonnet and opening stay can be made, in general, lighter in weight by improving the rigidity of the hook retaining portion to which the distal end portion of the opening stay is hooked up with the aforesaid light reinforcement members.

While only certain embodiments of the invention have been specifically described herein, it will apparent that numerous modifications may be made thereto without departing from the spirit and scope of the invention.

What is claimed is:

1. An automotive vehicle bonnet structure, comprising:
    an opening stay having a base portion and a readily detachable hook portion at a distal end extending from a vehicle body side;
    a bonnet attachment arm rigidly attached to a bonnet; wherein said bonnet attachment arm has a hook retaining portion for attaching the distal end of said opening stay to hold said bonnet in an open state; wherein said bonnet attachment arm is directly connected to a support body by a hinge pin for pivoting the bonnet into the open state and the arm does not bend toward the bonnet;
    a reinforcement member incorporated in said bonnet, in a space formed between an outer panel and an inner frame of said bonnet, for reinforcing said hook retaining portion; and said reinforcement member comprising a hollow extruded member.

2. The automotive vehicle bonnet structure according to claim 1, wherein said reinforcement member extends from the vicinity of the hinge pin to the forward of the vehicle body.

3. The automotive vehicle bonnet structure according to claim 1, wherein said support body is attached to the vehicle body side, and said bonnet attachment arm is rotatably attached to said support body and attached to an inner frame of said bonnet, and said bonnet attachment arm, the inner frame of said bonnet and said reinforcement member are bolted together.

4. The automotive vehicle bonnet structure according to claim 3, wherein said hook retaining portion is formed in one end of said bonnet attachment arm.

* * * * *